United States Patent [19]
Michler

[11] Patent Number: 5,489,172
[45] Date of Patent: Feb. 6, 1996

[54] QUICK-RELEASE FASTENING DEVICE

[76] Inventor: Walter Michler, Am Lochfeld 7, D-8088 Eching, Germany

[21] Appl. No.: 137,070
[22] PCT Filed: Apr. 27, 1992
[86] PCT No.: PCT/EP92/00917
 § 371 Date: Feb. 8, 1994
 § 102(e) Date: Feb. 8, 1994
[87] PCT Pub. No.: WO92/19496
 PCT Pub. Date: Nov. 12, 1992

[30] Foreign Application Priority Data

Apr. 27, 1991 [DE] Germany ............ 41 13 824.4

[51] Int. Cl.⁶ .................. B60D 7/08; B61D 45/00
[52] U.S. Cl. .............. 410/105; 410/104; 244/118.1
[58] Field of Search .................... 410/104, 105, 410/101, 74, 75; 244/118.1; 248/499, 500, 503, 503.1; 24/68 CD, 115 K, 265 CD

[56] References Cited

U.S. PATENT DOCUMENTS

| | | |
|---|---|---|
| 3,381,921 | 7/1968 | McDonough . |
| 3,677,195 | 7/1972 | Prete, Jr. . |
| 4,114,947 | 9/1978 | Nelson ............ 248/503.1 X |
| 4,185,799 | 1/1980 | Richards, Jr. . |
| 4,256,424 | 3/1981 | Knox et al. ............ 410/104 X |
| 4,277,043 | 7/1981 | Weik . |
| 4,376,522 | 3/1983 | Banks .................. 248/503.1 |
| 4,493,470 | 1/1985 | Engel ................ 410/105 X |
| 4,496,271 | 1/1985 | Spinosa et al. ........... 410/105 |
| 4,787,577 | 11/1988 | Whittle ............. 244/118.1 X |
| 4,856,738 | 8/1989 | Martin ................ 410/105 X |
| 5,337,979 | 8/1994 | Bales et al. ............ 244/118.1 |

FOREIGN PATENT DOCUMENTS

| | | |
|---|---|---|
| 0105675 | 4/1984 | European Pat. Off. . |
| 0215495 | 3/1987 | European Pat. Off. . |
| 1431569 | 11/1968 | Germany . |
| 2161735 | 12/1974 | Germany . |
| 2556000 | 6/1977 | Germany ............ 410/105 |
| 2732460 | 1/1978 | Germany . |
| 3447178 | 7/1986 | Germany . |
| 3631097 | 3/1987 | Germany . |
| 3804354 | 8/1989 | Germany . |

Primary Examiner—Michael S. Huppert
Assistant Examiner—Stephen Gordon
Attorney, Agent, or Firm—Helfgott & Karas

[57] ABSTRACT

A quick-change track lock for securing interior-design articles on C-shaped retaining tracks on a floor or walls in an airplane, a helicopter or a spacecraft includes a main body, a detent member for fixing the track lock in a retaining track, a locking body having mushroom-shaped locking members operable for engagement with undercut portions of the retaining track and a pivotable actuating lever cooperating with the locking body to displace the latter relative to the main body. The locking body is guided in the main body such that a distance between each locking member and clamping edges of the main body becomes smaller when the locking body is displaced from one placed position to a locked position.

15 Claims, 7 Drawing Sheets

QUICK-RELEASE FASTENING DEVICE

BACKGROUND OF THE INVENTION

The present invention relates to a quick-release fastening device and, more specifically to a so called "quick-change track lock" for securing of interior-design articles in an aircraft, helicopter or spacecraft or for securing load-restraining members on C-shaped retaining tracks laid in the floor or wall of the space/aircraft interior, comprising a main body; at least one detent member associated with the main body and serving to fix the track lock longitudinally in the retaining track; and a locking body guided in the main body and displaceable in the longitudinal direction of the track lock, said locking body comprising at least one mushroom-shaped locking member intended to engage the undercut portions of the retaining track.

Quick fastening devices are known and used in a variety of embodiments. They are in use in three different categories, namely for cooperation with retaining tracks of the categories (types) "light-duty track", "medium-duty track" and "heavy-duty track". A quick fastening device of this type is known from EP-A-0105675. If this track fastening device is used, the article that is to be secured can be secured on the retaining track directly in the position in which it was placed on the retaining track, it not being necessary to displace the article. The main body used in the known track fastening device comprises a channel with a T-shaped cross section, the locking body being guided in said channel. This publication, however, does not indicate the manner in which the locking body is displaced in the main body. Nor does it discuss how to establish a play-free, rattle-proof connection between the track fastening device and the retaining track.

Further quick fastening devices are known, for example, from German patent application 25 56 000, German patent specification 21 61 735 and U.S. Pat. No. 3,677,195. In each case, the mushroom-shaped locking members are rigidly connected to the respective main body, while the cylindrical detent pins provided as detent members are accepted, displaceable in their axial direction, in the respective main body. The corresponding actuating lever is used to raise or lower the detent pins in the main body. The track fastening device is installed in the retaining track in that the track lock is placed on the retaining track in a position in which the mushroom-shaped locking members are able, with their heads, to pass through the cutouts in the retaining tracks; subsequently, the track lock is displaced by half a pitch, i.e. by half the distance between two cutouts in the retaining track, in the longitudinal direction of the retaining track, with the result that the heads of the locking members come underneath the protrusions disposed between every two cutouts in the retaining tracks. Finally, by operation of the actuating lever, the detent pin is lowered and latches into a cutout in the retaining track, thereby preventing further longitudinal displacement of the track lock in the retaining track.

The quick fastening device as set forth in German patent specification 27 32 460 employs the same locking principle. In this case, however, the locking members are not rigidly mounted on the main body, but are disposed on plates that can be swiveled to a Might extent with respect to the main body, with the result that all the locking members are uniformly loaded. The same, aforedescribed locking principle is further employed by the track fastening device set forth in German patent application 36 31 097, wherein the detent pin is not guided in axially displaceable manner in the main body, but is disposed on a rocker arm swivelably held in the main body. Finally, the same, aforedescribed locking principle is employed by the fastening device as set forth in German patent application 38 04 354 and German patent specification 34 47 178, wherein the corresponding fastening devices, however, do not include an actuating lever. In these just-mentioned devices, a tool is used to displace the detent pin in its axial direction in the main body in order to cause the locking or release of the track fastening devices in the retaining track.

Finally, U.S. Pat. No. 4,185,799 discloses a track fastening device that comprises a number of individual components and is assembled in situ, i.e. on the retaining track. Consequently, this is not a quick-change track lock. The track fastening device is assembled/installed in such a manner that, first, a locking body with mushroom-shaped detent members is inserted from above into the retaining track—with the locking members passing through corresponding cutouts in the retaining track—and is then displaced by half a pitch in the longitudinal direction of the retaining track. Subsequently, a retainer is inserted into one of the cutouts in the retaining track and is pushed down onto the locking body, with the result that the locking body is locked against longitudinal displacement. Finally, the main body is pushed in the longitudinal direction of the retaining track onto a corresponding protrusion of the locking body and main body, locking body and retainer are clamped together by means of a bolt.

Therefore, common to all the aforementioned track fastening devices is the fact that the main body, carrying the aircraft interior-design article to be secured, is not in its final position when it is placed on the retaining track. Rather, in the aforementioned devices, the main body is first displaced on the retaining track in the longitudinal direction thereof in order to be brought into its final position. This has the disadvantage that the space available in aircraft interiors is not put to optimal use, since the articles to he secured cannot always be ideally positioned. This is because space is lost through the requirement that, in general, half a pitch, i.e. 0.5 inch by the prevailing standard, of space in the longitudinal direction of the retaining track be made available for the installation of the track lock. In many cases, the space required for displacement is not at all available, as a result of which the use of the known track fastening devices is rendered entirely impossible.

SUMMARY OF THE INVENTION

The object of the present invention is to create a "quick-change track lock" of the general type hereinbefore described, which would permit a play-free, rattle-proof connection between the track lock and the retaining track. The track lock, acting as a link between aircraft, helicopter or similar and the secured article, is to he installable quickly and without tools on the retaining track. Furthermore, it is to be usable for securing an extremely wide range of different articles.

The object of the invention is achieved in that an actuating lever is provided, said actuating lever coacting with the locking body in such a manner that, when the actuating lever is swiveled, the locking body is displaced with respect to the main body in the longitudinal direction thereof, and in that the locking body is guided in the main body in such a manner that the distance between the locking members and the clamping edges of the main body becomes smaller when the locking body is displaced from the as-placed position into the locked position, to establish an antirattle connection. The distance between the locking member(s) and the detent member(s) as measured in the longitudinal direction of the main body can thus be changed by swiveling the actuating lever. The "longitudinal direction" of the main body is always understood to be the direction that extends parallel to the longitudinal direction of the retaining track with which the track lock is intended to cooperate. In order to establish the antirattle connection between the track lock and the retaining track, the guides in which the locking body slides in the main body when being displaced between the as-placed position and the locked position may be disposed at a slight angle, with the angle being such that the distance between the clamping edges of the main body and the clamping surfaces of the locking members becomes smaller when the locking body is displaced from the as-placed position into the locked position. In this manner, with the track lock in the locked position, the protrusions of the retaining track are firmly clamped between the clamping edges of the main body and the locking members of the locking body, this resulting in a raffle-proof locked state. This obviates the need for the otherwise customary antirattle locking members.

Hereinbelow, the invention will be described with reference to those track locks that comprise a plurality of detent members and locking members. However, the same holds true for track locks with just one detent member and/or locking member.

The detent member(s) may be in the form of detent pin(s) rigidly connected to the main body; this permits in particular the simple construction of the device according to the invention, which then consists of as few individual components as possible. It is, however, also possible to provide detent pins that are guided in the main body and are displaceable in the axial direction; such a design allows the track lock, when placed on the retaining track, to be displaced in the longitudinal direction when the detent pins are raised and brought out of engagement with the corresponding cutouts in the retaining track, this being of advantage under certain installation conditions. The raising of the detent pins may be accomplished independently of the displacement motion of the locking body or may be mechanically coupled thereto. The same advantage can be achieved in that the detent members consist of detent pins that are flattened on both sides and are rotatable about their axis. The flats are such that the smallest width of the detent pins is less than the clear width between two opposite protrusions of the retaining track. When the detent pins are rotated into the position in which their greatest width extends in the longitudinal direction of the retaining track or in which their smallest width extends transversely thereto, the detent pins are able to pass between the protrusions of the retaining track, and the track lock is able to be displaced thereon. A 90° rotation of the detent pins locks the track lock on the retaining track in the longitudinal direction.

A further preferred embodiment of the track lock comprises detent members that each consist of two detent-pin segments. These are positioned -opposite each other in the transverse direction of the device, and between them is a channel in which the locking body is guided. Said detent-pin segments are relatively short in their axial extent, i.e. with the track lock placed on the retaining track, they do not extend as far as the base of the retaining track; rather, they terminate at such a distance above the base of the retaining track that the heads of the locking members are able to be accommodated in the space in between.

In the as-placed position, i.e. in the position in which the track lock according to the invention is placed onto the retaining track, the locking members are separated from the detent members by a distance corresponding to the retaining-track pitch or to a whole-number multiple thereof. If the detent members are in the form of solid detent pins, the distance between detent pin and locking member in the as-placed position corresponds at least to the single value of the retaining-track pitch. Conversely, if the detent members consist of two detent-pin segments with locking body guided therebetween, then, with the locking body in the as-placed position, the locking members and the detent members may be aligned coaxially, i.e. the heads of the locking members come to lie in an extension of the detent-pin segments. This permits a particularly compact, space-saving construction of the track lock also in cases where two or more locking members and detent members are provided.

When the track lock is placed onto the retaining track in the as-placed position, the detent members enter corresponding cutouts in the retaining track and/or the detent pins in the form of axially displaceably guided cylinders find themselves, if in the raised position, above corresponding cutouts; and, at the same time, the mushroom-shaped locking members pass through corresponding cutouts in the retaining track. If the actuating lever is now moved to the locked position, i.e. to the position in which the track lock is securely connected to the retaining track, then the locking body is displaced in the retaining track by half a retaining-track pitch, while the main body, secured by the detent members (now lowered if appropriate), retains its position. Consequently, in the locked position, the locking members are situated underneath the protrusions disposed between two cutouts in the retaining track and engage said protrusions from below. When being installed, therefore, the track lock can be placed on the retaining track precisely in the position in which it will also be upon completion of installation. Once the track lock has been placed on the retaining track, it is not necessary to displace the main body; the space available in the interior of the aircraft can be put to optimal use, since the installation of furniture and the like does not require the articles to be longitudinally displaceable. Even heavy articles, such as a cell comprising a complete medical-equipment set, which require technical equipment for lifting and moving, can be secured particularly advantageously in aircraft interiors using the quick-change track lock according to the invention. In cases where longitudinal displaceability of the as-placed track lock is desired, this can be accomplished—as already explained hereinbefore—by means of raisable detent pins displaceably guided in the axial direction or by means of the likewise hereinbefore-described detent pins that are swivelable about the vertical axis and are flattened on both sides. Such a design provides increased flexibility in the installation of articles that are fitted with the track lock according to the invention. This permits a so-called "quick-change interior", allowing the interior to be changed during the short periods for which the aircraft is on the ground.

The quick-change track lock according to the invention, used under the name of "quick-floor-rail-attachment" or "Quickchange", is suitable for cooperation with the three conventional categories of seat tracks known in the aviation industry ("light-duty track", "medium-duty track" and "heavy-duty track").

The active connection between the actuating lever and the locking body may be implemented in various manner. In a particularly preferred embodiment, said connection consists of a link, said link having an articulated connection to the actuating lever and the locking body, with the respective articulation axis extending transversely with respect to the displacement direction of the locking body, i.e. transversely with respect to the longitudinal axis of the main body, with it being advantageous for the link to be subjected to tensile loading during locking, i.e. when the actuating lever is brought from the as-placed position into the locked position. Another preferred embodiment of the active connection between the actuating lever and the locking body consists of a toothed connection, with the actuating lever comprising a toothed segment and the locking body being associated with a linear toothed rack. This makes it possible to save on one of the components (the link) and to facilitate the installability of the device. Furthermore, the actuation of the locking body may be accomplished by an eccentric, a spirally shaped guiding member connected to the lever, a slide block, a cam plate, a cam or similar.

The track lock according to the invention may comprise a further clamping mechanism that is activated simultaneously with or subsequently to locking, i.e. displacement of the locking body, and clamps the track lock against the retaining track, thereby providing a rattle-proof connection. In particular, the actuating lever or the swivel shaft thereof may in such a case be connected to a cam that acts on a spring pin guided in the main body. When the actuating lever for the locking body is swiveled, the spring pin is simultaneously pressed downwardly by means of the cam against the top edge of the retaining track, with the result that the track lock is clamped to the retaining track with zero play.

Additionally or alternatively, the track lock may be provided with elastic members, particularly ones made of rubber, in the zones of contact with the retaining track.

Various securing devices may be provided to secure the track lock against unintentionally coming loose. Preferably, a securing catch is disposed on the main body, said securing catch acting on the actuating lever when in the locked position. The corresponding securing catch may be held in the main body and may be both swivelable about an axis and also longitudinally displaceable. To afford a more compact construction, said securing catch may also be disposed at 90° to the actuating lever. It is advantageous that the securing catch should be spring-loaded, i.e. held by a spring in its actuating-lever-securing position. It is also possible for the interior of the track lock, i.e. one of the sliding surfaces between the main body and the locking body, to be provided with a detent mechanism of known type, said detent mechanism consisting, for example, of a spring-loaded detent ball and, with the locking body in the locked position, preventing displacement thereof with respect to the main body. Additionally or alternatively, the track lock may further be provided with a lock that prevents the track lock from being unlocked by unauthorized persons.

It is advantageous that the main body should be of such design that the articles to be secured can be attached directly thereto. Accordingly, preferred embodiments of the track lock according to the invention comprise attachment surfaces formed on the main body and integral therewith, said attachment surfaces being aligned parallel to the surface of the retaining track and thus to the interior floor or, alternatively, perpendicular thereto, wherein, in the latter case, the corresponding attachment surface may extend parallel or transversely to the longitudinal direction of the retaining track. It is also possible for the main body to be formed with two attachment surfaces forming an angle for the attachment of an edge fitting. It is further conceivable to fit the main body with simple cargo-restraining units, such as hooks, eyes, nets, pallets or similar.

Connected to the main body of the track lock or integrated therein, an intermediate member may be provided, with the article to be secured being attached to said intermediate member. The intermediate member allows the adjustability of the main body of the track lock with respect to the article to be secured, preferably in the orthogonal axes. This makes it possible to compensate any track tolerances that may occur. Furthermore, the intermediate member makes it possible to take up so-called prying load or floor deflection, through additional joints and sliding-block guides.

DETAILED DESCRIPTION OF THE PREFERRED EMBODIMENTS

Figure 1:
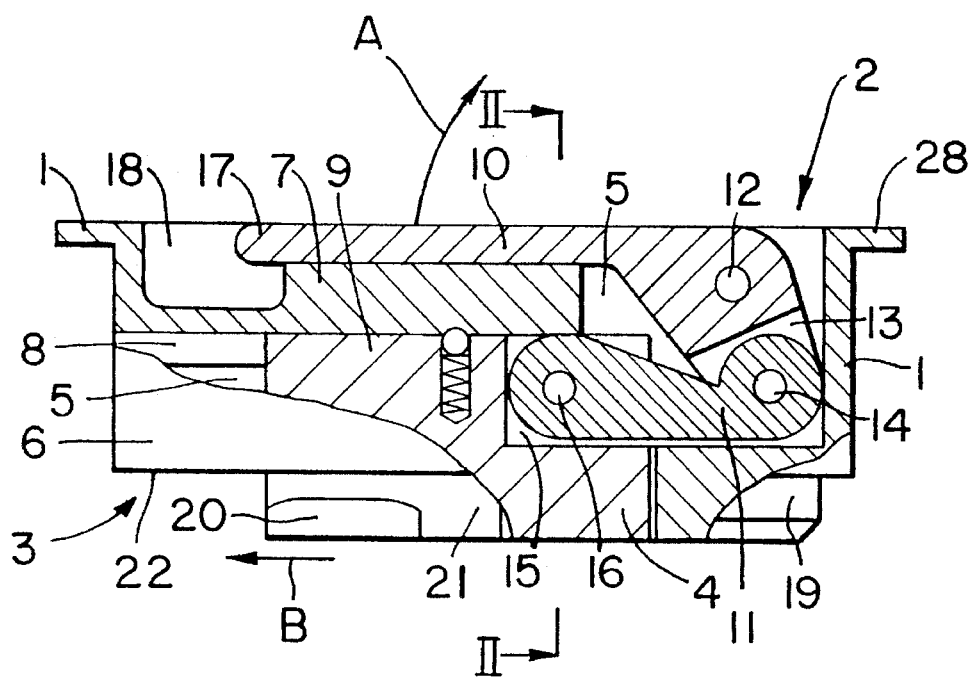
FIG. 1 shows a longitudinal section and partial side view of a first embodiment of the track lock according to the invention in a combined view, with a fixed-position detent pin being provided.
Figure 2:
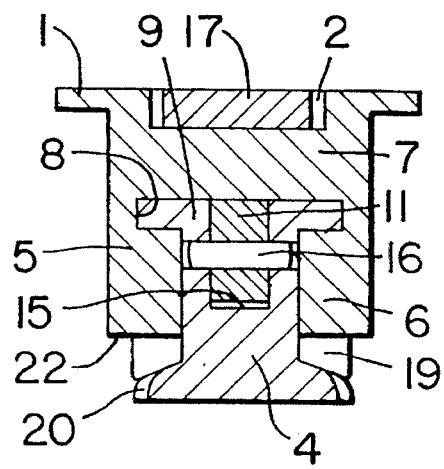
FIG. 2 shows a cross section through the track lock shown in FIG. 1 along line II—II.

As shown in FIGS. 1 and 2, the main body 1 serves as a housing for the extensive accommodation of the individual components of the track lock, with the main body 1 comprising an upper space 2 for accommodation of the lever mechanism as well as a lower space 3 for longitudinally displaceable accommodation of the locking body 4.

The lower space 3 is bordered laterally by the side walls 5, 6 as well as by the intermediate wall 7 of the main body and is open at the bottom. The inner surfaces of the side walls 5 and 6 of the main body comprise guide channels 8, with the result that the lower space 3 is T-shaped in cross section.

Corresponding to the T-shaped cross section of the lower space 3 of the main body, the head 9 of the locking body 4 likewise has a T-shaped cross section, which allows the locking body 4 to slide backwards and forwards, with sufficiently precise guiding, in the lower space 3 of the main body 1.

Figure 1A:
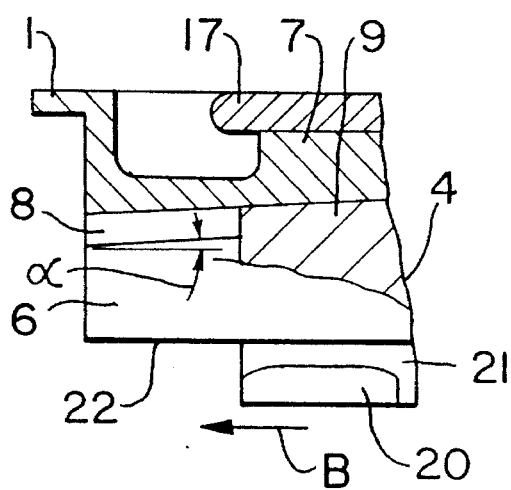
FIG. 1a shows the antirattle mechanism provided according to the invention, in a heavily exaggerated view.

The antirattle mechanism provided on track locks according to the invention is elucidated in FIG. 1a. More specifically, the channels 8 in which the locking body 4 is guided do not extend parallel to the clamping edges 22 of the main body 1; rather, the clamping edges 22 and the channels 8 together form an angle α. In this manner, the guide channels 8 are at such a slope with respect to the clamping edges that the distance between the clamping edges 22 of the main body and the mushroom-shaped locking members 20 of the locking body 4 becomes smaller when the locking body is displaced (in the opposite direction to arrow B) from the as-placed position into the locked position. The angle α is shown heavily exaggerated in FIG. 1a; in reality, it is only very small. For this reason, it is not discernible in the further drawings, although, there too, the antirattle mechanism according to the invention is implemented.

To displace the locking body 4 in the main body 1, a lever mechanism, composed of the actuating lever 10 and the link 11, is provided. The actuating lever 10 is swivelable about a transversely extending swivel shaft 12, which is held in the side walls 5, 6 of the main body 1. The jaws 13 of the actuating lever 10 accept between them one end of the link 11, with there being an articulated connection between the link 11 and the actuating lever 10 in that held in the jaws 13 is a transversely extending swivel shaft 14 on which the link 11 can be swiveled. The other end of the link 11 engages a suitably dimensioned cutout 15 in the locking body 4 and is articulatedly connected to the locking body 4 so as to be swivelable about a transversely extending swivel shaft 16 disposed therein. The lever mechanism as shown and described has the effect that, when the actuating lever 10 is swiveled in the direction of arrow A, the locking body 4 in the main body 1 is displaced in the direction of arrow B. To allow better gripping of the user-operated end 17 of the actuating lever 10, which is recessed into the main body 1, a recess 18 is provided in the main body 1 in the region of the aforementioned end.

The locking mechanism is composed of the cylindrical detent pin 19 and two mushroom-shaped locking members 20, with the detent pin 19 being integrally formed on the underside of the main body 1. The locking members 20 constitute an integral part of the locking body 4; they are formed in the lower region thereof, projecting from the main body 1. For increased strength, the two locking members 20 are connected to a web 21, with the web being of such width that it is accommodated between the (hereinbelow-described) protrusions of the retaining track when the main body is resting, with the clamping edges 22 of the side walls 5, 6, on the retaining track.

A conventional detent mechanism, consisting of a spring-loaded ball and recessed into the locking body 4, locks the locking body against unintentional displacement out of the locked position shown in FIG. 1. An attachment surface 28, in the form of a continuous all-round lip at the top on the main body 1, is used to attach the quick-change track lock to the article in question (seat, partition, bottom panels of galleys or other built-in cabinets etc.).

Figure 3:
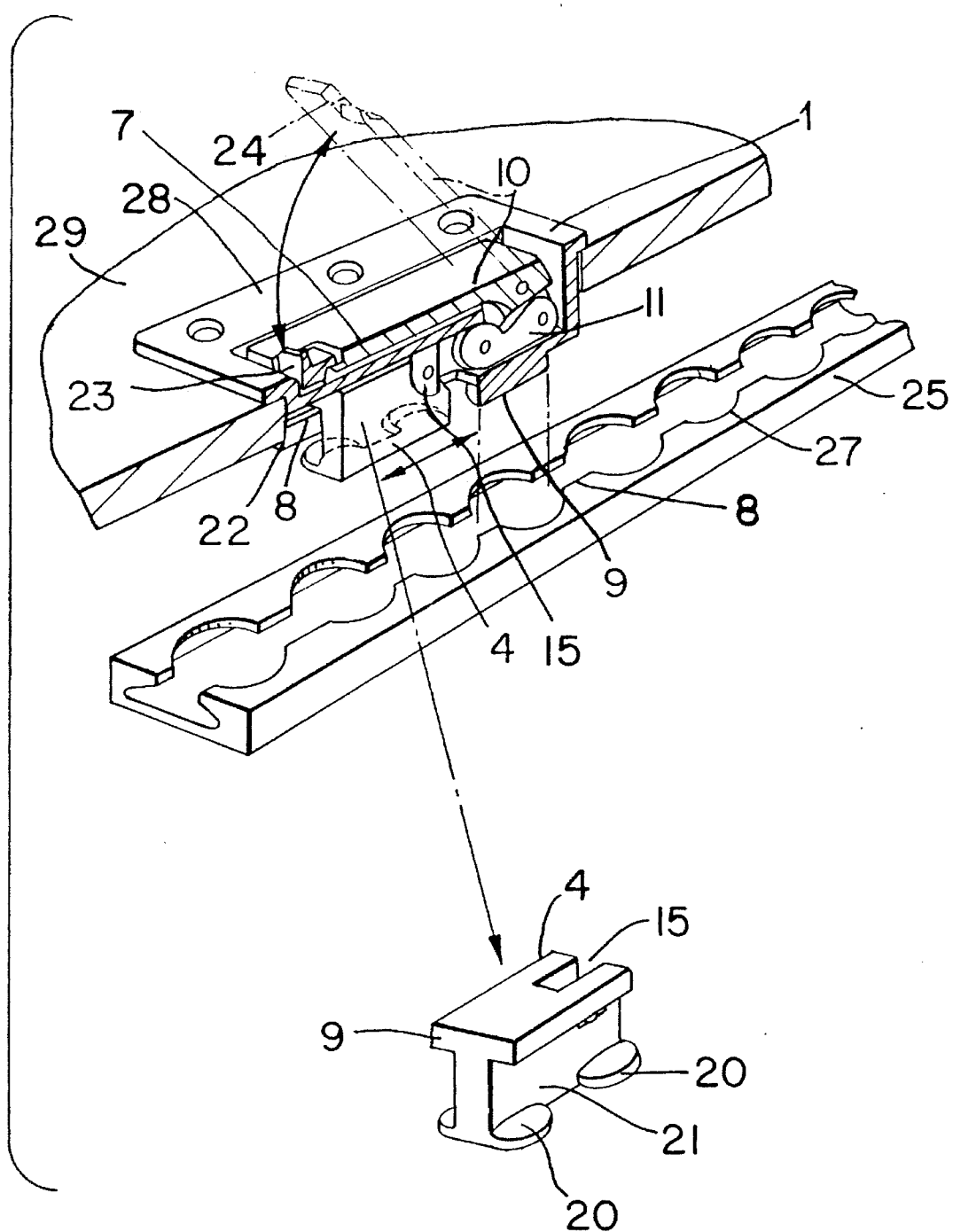
FIG. 3 shows a longitudinal section through a second embodiment of the track lock according to the invention, likewise with fixed-position detent pin, in a perspective view.

In its basic construction, the track lock shown in FIG. 3 is identical to that shown in FIGS. 1 and 2, with the result that reference can be made inasmuch to the corresponding explanatory remarks. Unlike the embodiment shown in FIGS. 1 and 2, however, the track lock is in this case secured against unintentional loosening by means of a securing catch 23, which is longitudinally displaceably guided in the intermediate wall 7 of the main body 1 and, with the actuating lever in the locked position, engages a securing lug 24 disposed on the actuating lever 10. This prevents the actuating lever from being unintentionally raised, thereby releasing the track lock. Furthermore, said securing catch also serves to raise the actuating lever out of the locked position.

FIG. 3 further shows the C-shaped retaining track 25, with which the track lock is intended to cooperate. This is a standard track of 1-inch pitch, i.e. there is a one-inch space between every two adjacent protrusions 26 and between every two adjacent cutouts 27. Accordingly, the two mushroom-shaped locking members 20 of the locking body 4 are also spaced apart at one-inch intervals.

Further visible in FIG. 3 is the attachment surface 28, which is integrally formed with the main body and comprises holes for accepting screws, bolts, rivets or similar. Said attachment surface 28 extends in a plane parallel to the surface of the retaining track 25 and thus—if the retaining track is installed in the floor of the interior—parallel to the floor of the interior of the aircraft; should the retaining track 25 be mounted on a vertical wall, then the attachment surface 28 will also be vertically aligned as appropriate. The track lock shown in FIG. 3 is therefore used primarily for the attachment of a panel 29 or of the undersides of articles that are to be secured, in an alignment parallel to the floor of the interior. It is likewise possible to provide a nonparallel attachment flange.

Figure 4:
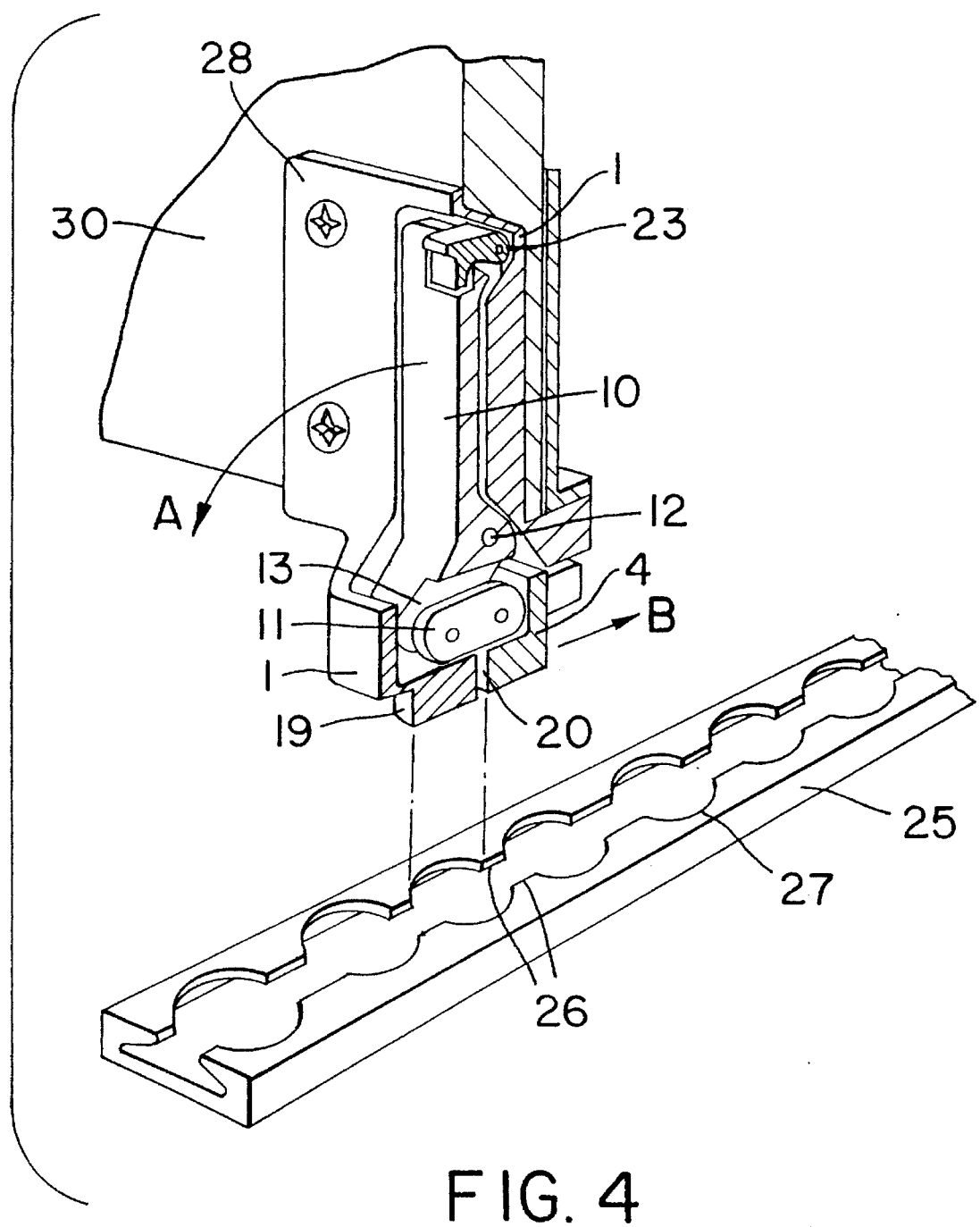
FIG. 4 shows a longitudinal section through a third embodiment of the track lock according to the invention, likewise with fixed-position detent pin, in a perspective view.

Conversely, the track lock shown in FIG. 4 is designed—should the retaining track be laid in the floor of the interior—to attach to the retaining track 25 a vertically extending partition 30 or side walls of articles that are to be secured. The section of the main body 1 in which the locking body is longitudinally displaceably guided passes vertically through the partition 30. In the locked position shown, the actuating lever 10 is perpendicular with respect to the longitudinal direction of the main body 1 and of the retaining track 25.

As for the rest, the only substantial differences between the track lock shown in FIG. 4 and the one shown in FIG. 3 are that the locking body 4 comprises just one mushroom-shaped locking member 20 and that the securing catch in the main body is not longitudinally displaceable, but, by contrast, is swivelable.

Figure 5:
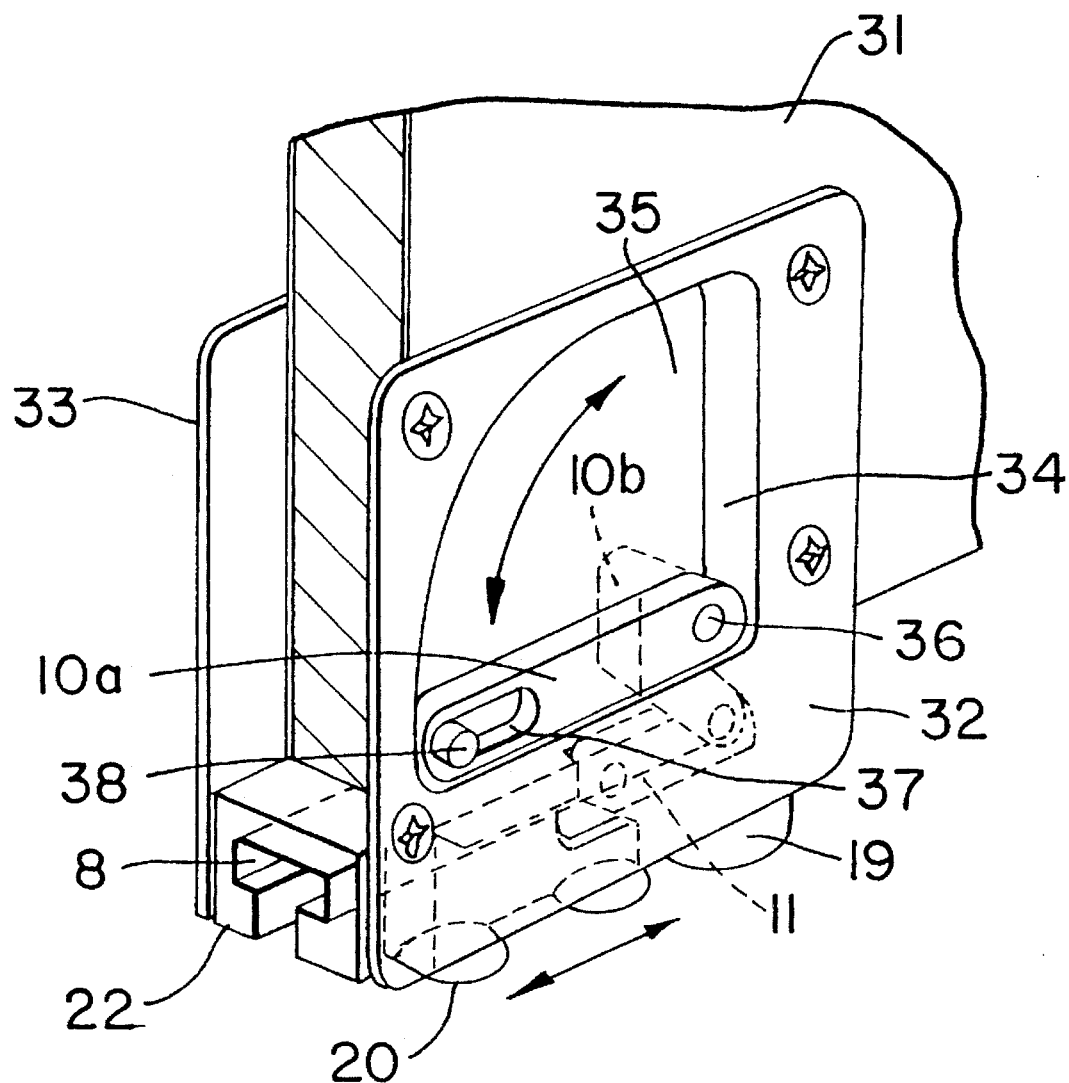
FIG. 5 shows the perspective view of a fourth embodiment of the track lock according to the invention, likewise with fixed-position detent pin.

The track lock shown in FIG. 5 is used to secure a vertical partition 31 extending in the longitudinal direction of the retaining track. For this purpose, the partition is imbedded between two attachment plates 32, 33 connected to the main body. The actuating lever 10 is recessed, i.e. the partition 31 has a cutout to accept the recess 34 provided in the attachment plate 32, with the outer arm 10a of the actuating lever 10 being swivelable inside said recess 34. The inner arm 10b of the actuating lever is behind the wall 35 of the recess and is connected to the outer arm by means of the swivel shaft 36.

For its locking, the outer arm 10a of the actuating lever 10 has an oblong hole 37, which is engaged, in the locked position (shown), by a securing bolt 38 swivelably connected to the wall 35 of the recess.

As for the rest, the construction and operating principle of the track lock shown in FIG. 5 are identical to those of the hereinbefore-described embodiments, with the result that reference is made to the corresponding explanatory remarks.

Figure 6:
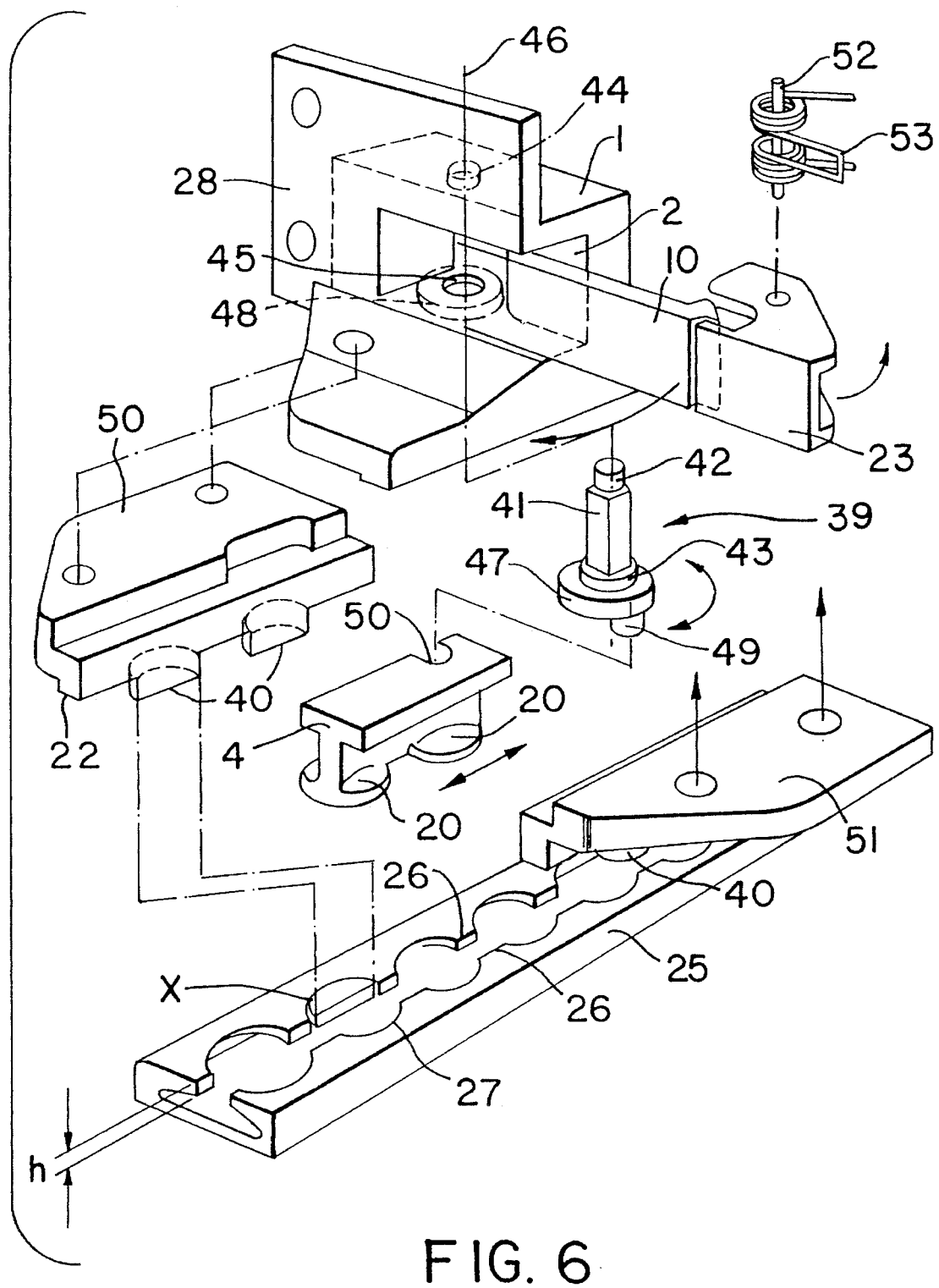
FIG. 6 shows a fifth embodiment of the track lock according to the invention in an exploded view, with each detent member consisting of two fixed-position detent-pin segments.

The locking mechanism of the track lock shown in FIG. 6 differs basically in two points from those shown in FIGS. 1–5. First, an eccentric 39 is provided as the active connection between the lever 10 and the locking body 4; and, second, each detent member consists of two detent-pin segments 40, which are positioned opposite each other in pairs.

The main body 1 is provided in the hereinbefore-described manner with a space 2 for accommodation of the actuating lever 10. The eccentric 39 is rotation-locked to the actuating lever 10 by means of the square section 41. The pin 42 provided at the top on the square section as well as the collar 43 provided below the square section 41 are accepted in corresponding holes 44 and 45, respectively, in the main body 1, as a result of which the eccentric 39 and, with it, the actuating lever 10 are held in the main body 1 in such a manner as to be swivelable about the axis 46. The eccentric disk 47 enters the corresponding recess 48 in the main body.

Projecting downwardly from the eccentric disk 47 is the eccentric pin 49, which, with the device assembled, engages the groove 50 on the locking body 4.

The main body is of split construction. In addition to the upper section, which accommodates the actuating lever 10 and the eccentric 39, it comprises two jaws 5 1, which, with the track lock in its ready-assembled state, are securely screwed to the upper part. With the track lock assembled, the locking body is longitudinally displaceably guided in the hereinbefore-described manner in the main body composed of upper part and jaws. Through the swiveling of the actuating lever 10, the locking body 4 is displaced in the longitudinal direction in the main body by means of the eccentric 39, with the displacement travel being equivalent to half the pitch of the retaining track 25.

Two detent-pin segments 40 are formed on each jaw 51. Said detent-pin segments 40 project downwardly just slightly, namely by dimension h of the retaining track 25, from the clamping edge 22, with which the track lock rests on the top of the retaining track 25. The locking members 20 of the locking body 4 are thus able to be displaced underneath the detent-pin segments 40. With the track lock in the as-placed position, i.e. in the position in which the track lock is placed onto the retaining track 25, the mushroom-shaped heads of the locking members 20 are in a position aligned with the detent-pin segments 40. In this position, the heads of the locking members 20 are able to pass through the cutouts 27 in the retaining track, and, at the same time, the detent-pin segments 40 enter the same cutouts 27. Shown at X is a detent-pin segment 40 that has been inserted into a cutout 27. Subsequently, through the swiveling of the actuating lever 10, the locking body 4 is displaced by half a pitch in the longitudinal direction of the track lock, with the result that the heads of the locking members 20 are situated underneath the protrusions 26 in the retaining track.

Swivelable about a swivel shaft 52, the securing catch 23 is recessed into the upper part of the main body. It is held under the preload of the spring 53 in the position that locks the actuating lever 10.

Formed on the upper pan of the main body 1 is an attachment surface 28 that extends perpendicularly with respect to the retaining track. This design employing an eccentric permits angles from 0°–90° between track and panel. As for the rest, the device shown in FIG. 6 is identical to the hereinbefore-described embodiments of the track lock, with the result that reference can be made to the corresponding remarks.

Figure 7:
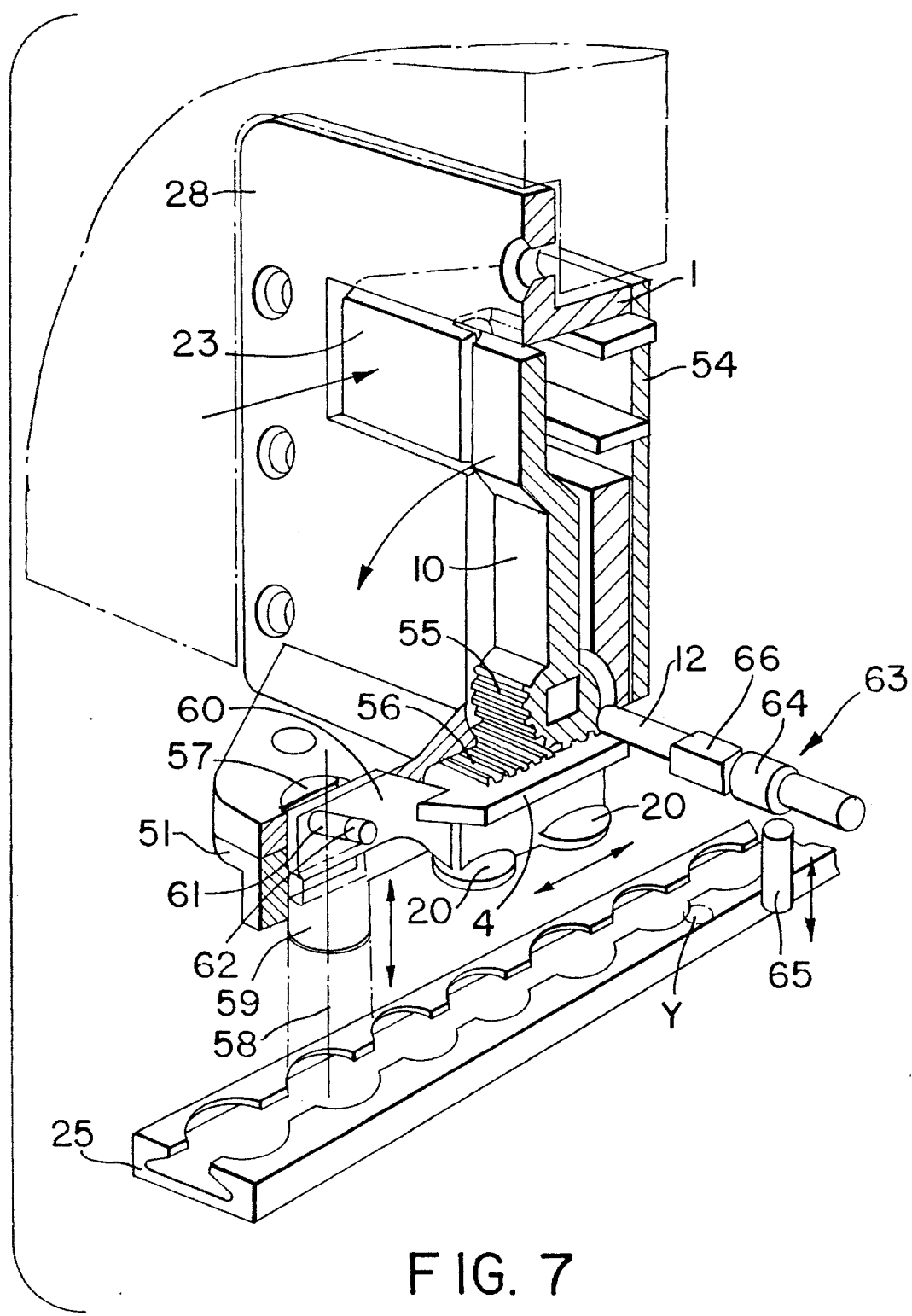
FIG. 7 shows a longitudinal section through a sixth embodiment of the track lock according to the invention in a perspective view, with the detent pin being raisable and lowerable.

The embodiment of the track lock shown in FIG. 7 differs in three substantial points from the hereinbefore-described embodiments. First, a toothed connection is provided as the active connection between the actuating lever 10 and the locking body 4. Second, the detent pin is not fixedly connected to the main body, but is axially displaceably held therein. Third, an antirattle mechanism is connected to the actuating lever. As in the case of the track lock shown in FIG. 6, the main body comprises an upper pan and two jaws 51 fixedly connected thereto. The rear side of the upper pan is covered by a plate 54.

The actuating lever 10, held in the main body 1 on the swivel shaft 12, has a toothed segment 55. The locking body 4 is provided with a toothed rock 56 cooperating with the toothed segment 55, said toothed rack 56 constituting the top side of the locking body 4. As a result of this toothed connection, the swiveling motion of the actuating lever 10 is converted into the translational motion of the locking body 4 in the longitudinal direction of the track lock.

A hole 57 with vertical axis 58 is provided in the main body. The detent pin 59 is displaceably guided in said hole 57. The vertical motion of the detent pin 59 is mechanically coupled to the horizontal motion of the locking body 4. Provided for this purpose on the locking body 4 is a flat protrusion 60, which comprises an obliquely disposed oblong hole 61. Guided in said oblong hole 61 is a pin 62, which is inserted into the detent pin 59. When, as a result of the swiveling of the actuating lever 10, the locking body 4 is displaced in the longitudinal direction of the track lock, the pin 62 slides in the oblong hole 61, which serves as a guide, and thereby displaces the detent pin 59 in the axial direction.

The antirattle device 63 comprises a cam 64, which is provided on the swivel shaft 12 of the actuating lever 10, and a spring pin 65, which is guided in the main body and is displaceable in the vertical direction. The cam 64 is rotation-locked to the actuating lever 10 by a square section 66 on the swivel shaft 12, said square section 66 engaging a square hole in the actuating lever 10. With the track lock in the locked position shown in FIG. 7, the cam 64 presses the spring pin 65 downwardly onto the retaining track; marked at Y is the corresponding support point of the spring pin on the retaining track 25.

Figure 8:
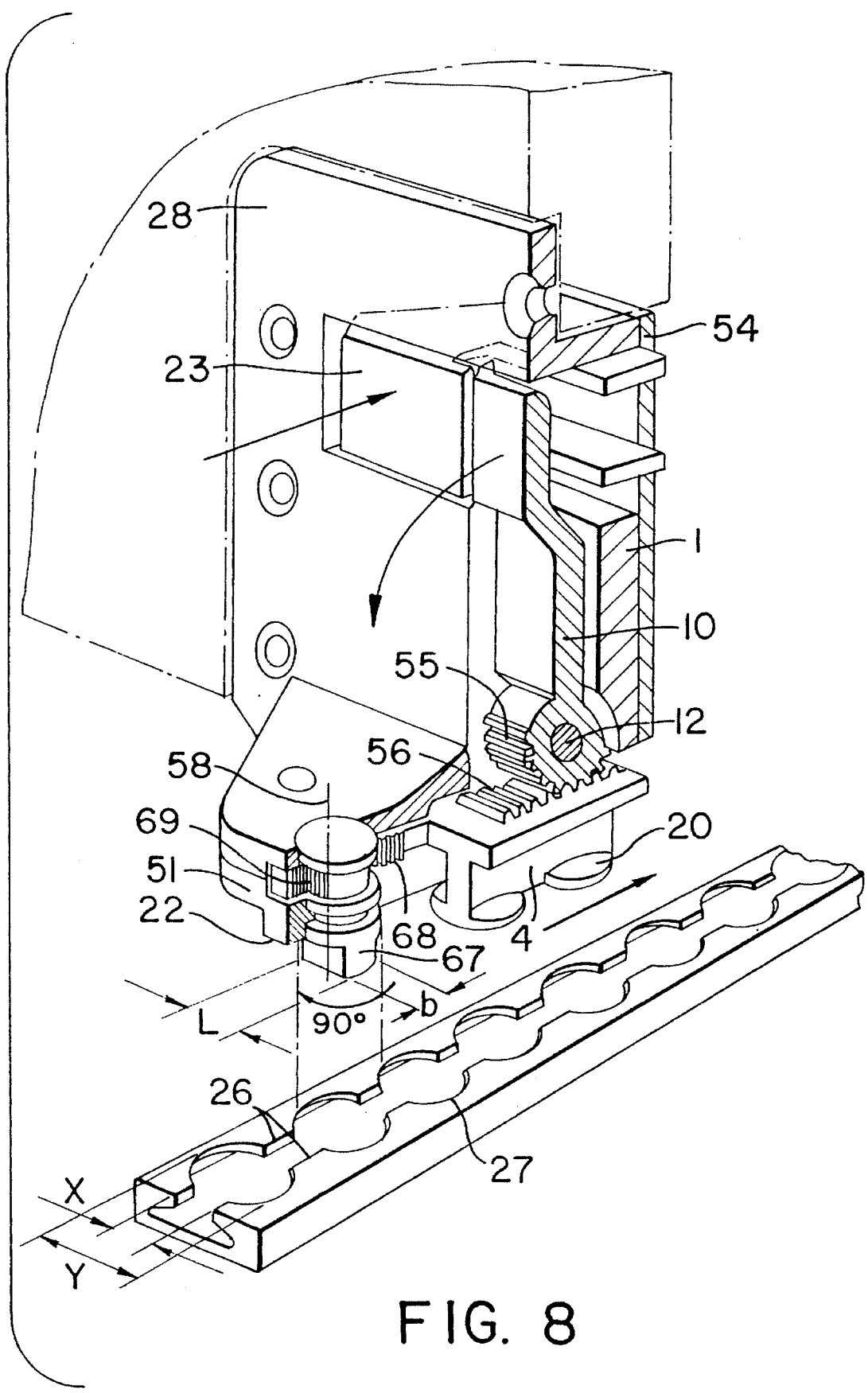
FIG. 8 shows a longitudinal section through a seventh embodiment of the track lock according to the invention in a perspective view, with the detent pin being swivelable about its axis.

The track lock shown in FIG. 8 is substantially identical to that shown in FIG. 7. In this case, however, it is not an axially displaceable detent pin that is provided as the detent member, but rather a detent pin 67 that is swivelable about its axis 58. In its region that cooperates with the retaining track 25, the detent pin is flattened on both sides in such a manner that its minimum extent b is slightly less than the clear width x between two opposite protrusions 26 of the retaining track 25. Conversely, the maximum extent 1 of the flattened detent pin 67 is substantially identical to the diameter y of the circular cutouts 27. The swiveling motion of the flattened detent pin 67 about the vertical axis 58 is coupled to the translational motion of the locking body 4 in that provided on the locking body 4 is a toothed rack 68 that cooperates with a toothed segment 69 provided on the detent pin 67. With the track lock in the locked position shown in FIG. 8, the maximum dimension 1 of the detent pin 67 extends transversely with respect to the longitudinal direction of the retaining track 25, and the distance between the detent pin and the locking member 20 nearest thereto is 1½ times the pitch of the retaining track 25. Conversely, with the track lock in the as-placed position, i.e. with the actuating lever 10 in the downwardly swiveled position, the detent pin 67 is swiveled through 90°, with the result that its maximum extent 1 extends in the longitudinal direction of the retaining track, whereas the minimum extent b extends transversely thereto; and the distance between the detent pin 67 and the locking member 20 nearest thereto is equivalent precisely to the single value of the retaining-track pitch.

The track lock shown in FIG. 8 is provided in the hereinbefore-described manner with an antirattle mechanism; as for the rest, said track lock is substantially identical to the one shown in FIG. 7, with the result that reference can be made to the corresponding explanatory remarks.

What is claimed is:

1. Quick-change track lock for securing interior-design articles or load-restraining members on C-shaped retaining tracks laid in a floor or on a wall of an interior in an airplane, a helicopter or spacecraft, the lock comprising a main body (1) having clamping edges (22); at least one detent member (19, 40, 59, 67) associated with the main body (1) for fixing the track lock longitudinally in a retaining track; a locking body (4) guided in the main body (1) and displaceable in a longitudinal direction of the track lock, said locking body (4) including at least one mushroom-shaped locking member (20) adapted to engage undercut portions of the retaining track; an actuating lever (10) pivotally attached to said main body and coacting with the locking body (4) in such a manner that, when the actuating lever (10) is pivoted, the locking body (4) is displaced with respect to the main body (1) in a longitudinal direction thereof; and means for guiding the locking body (4) in the main body (1) in such a manner that a distance between each locking member (20) and the clamping edges (22) of the main body (1) becomes smaller when the locking body is displaced from an as-placed position into a locked position, to establish an antirattle connection.

2. Quick-change track lock according to claim 1, wherein said means for guiding include guide channels (8) provided in the main body (1), said guide channels (8) forming a small angle with the clamping edges (22).

3. Quick-change track lock according to claim 1, wherein said at least one detent member comprises a detent pin (19) rigidly connected to the main body (1).

4. Quick-change track lock according to claim 1, wherein said main body has a hole (57) and said at least one detent member comprises a detent pin (59) guided in the hole (57) of the main body (1) and displaceable in an axial direction (58) of said hole.

5. Quick-change track lock according to claim 4, wherein displacement of said detent pin (59) in the axial direction (58) is coupled by mechanical transmission means (60, 61, 62) to a motion of the locking body (4).

6. Quick-change track lock according to claim 1, wherein said at least one detent member comprises a detent pin (67) having an axis (58) and being rotatably mounted in the main body (1) for rotation about said axis (58), said detent pin (67) having a flattened cross section in a region thereof which cooperates with the retaining track.

7. Quick-change track lock according to claim 6, wherein a rotating motion of said detent pin is coupled by mechanical transmission means to a motion of the locking body.

8. Quick-change track lock according to claim 1, wherein each detent member comprises two oppositely positioned detent-pin segments (40), between which extends the displaceably guided locking body (4), wherein when the locking body (4) is in the as-placed position, the locking member (20) is aligned with a respective two of said detent-pin segments (40).

9. Quick-change track lock according to claim 1, wherein the actuating lever (10) is connected to the locking body (4) by an eccentric (39).

10. Quick-change track lock according to claim 1, wherein the actuating lever (10) is coupled to the locking body (4) by a toothed connection, wherein the actuating lever (10) is provided with a toothed segment (55) and the locking body (4) is provided with a toothed rack (56) cooperating with said toothed segment.

11. Quick-change track lock according to claim 1, wherein the actuating lever (10) is coupled to the locking body (4) by a link (11) articulatedly connected to the actuating lever and to the locking body and having an articulation shaft extending transversely to a displacement direction of the locking body (4).

12. Quick-change track lock according to claim 1, and further comprising a detent mechanism for locking the locking body (4) against displacement with respect to the main body (1) when the locking body is in the locked position.

13. Quick-change track lock according to claim 1, and further comprising a securing catch (23) disposed on the main body (1) and acting on the actuating lever (10) to secure the track lock against unintentional loosening.

14. Quick-change track lock according to claim 1, and further comprising a cam (64) connected to said actuating lever and a spring pin (65) adapted to follow the cam, the actuating lever (10) adapted to actuate the cam (64), with said cam (64) actuating said spring pin (65), said spring pin being guided in the main body (1) and adapted to press on the retaining track.

15. Quick-change track lock according to claim 1, and further comprising an intermediate member disposed between the main body (1) and an article to be secured, said intermediate member permitting an adjustability of the main body with respect to the article to be secured.

* * * * *